UNITED STATES PATENT OFFICE.

JULIUS ALTSCHUL, OF BERLIN, GERMANY, ASSIGNOR TO ACTIEN-GESELLSCHAFT FÜR ANILIN FABRIKATION, OF BERLIN, GERMANY.

PEPSIN PREPARATION.

No. 806,615. Specification of Letters Patent. Patented Dec. 5, 1905.

Application filed July 8, 1905. Serial No. 268,870.

*To all whom it may concern:*

Be it known that I, JULIUS ALTSCHUL, chemist, of Berlin, in the Kingdom of Prussia, German Empire, have invented new and useful Improvements in the Manufacture of Preparations of Pepsin Containing Hydrochloric Acid; and I do hereby declare that the following is a full, clear, and exact description thereof, which will enable others skilled in the art to which it appertains to make and use the same.

Pepsin and hydrochloric acid are known to be the most important agents in gastric digestion; but all attempts to make satisfactory preparations that shall contain both these agents have failed. Mixtures of the two cannot be preserved. Moreover, in order to make a dry preparation containing any considerable proportion of aqueous hydrochloric acid an inconveniently-large proportion of some third substance must be introduced into the mixture to act as an absorbent of the liquid.

This invention relates to a process for the manufacture of stable preparations of pepsin containing hydrochloric acid.

The invention depends upon the fact that the hydrochlorids of aliphatic amido derivatives, such as amido acids and their alkyl derivatives or their esters, are so completely hydrolyzed by water that when they are dissolved or mixed with water the latter acquires the properties of hydrochloric acid, among which is the power to digest proteid in conjunction with pepsin. To apply this fact for making preparations of pepsin containing hydrochloric acid, the pepsin is mixed with a hydrochlorid of an aliphatic amido derivative which has no ill effect on the animal organism, such as betain hydrochlorid, glycocin hydrochlorid, alanin hydrochlorid, or leucin hydrochlorid. In the presence of water a mixture of this kind has all the digestive properties of a mixture of pepsin and hydrochloric acid. The hydrochlorids in question being solid substances may be ground with any proportion of pepsin, and the mixture is perfectly stable and can be made up into any desired form, such as pills or tabloids, which can be preserved without losing the property of digesting proteids in presence of water.

In practicing the invention the pepsin and the hydrochlorid—for instance, betain hydrochlorid—are ground together in such proportions that the mixture will contain the desired percentage of hydrochloric acid. For example, if this percentage is to be ten per cent. four parts of betain hydrochlorid are ground with six parts of pepsin, or to make a preparation containing twenty per cent. of pepsin and twenty per cent. of hydrochloric acid eight parts of betain hydrochlorid are ground with two parts of pepsin. If it merely be desired to obtain a pepsin which is soluble in water, a much smaller proportion of the hydrochlorid will suffice. For instance, when the latter is betain hydrochlorid two and one-half parts of it may be mixed with ninety-seven and one-half parts of pepsin.

Milk-sugar or any other pulverulent substance may be mixed with the pepsin and hydrochlorid to facilitate the making up thereof into the desired form of tabloids, pills, or the like.

Having thus described the nature of my said invention and the best means I know of carrying the same into practical effect, I claim—

1. As a new article of manufacture a preparation consisting of a mixture of pepsin and the hydrochlorid of an aliphatic amido derivative which has no ill effect upon the animal organism, which preparation is stable when preserved and is capable of digesting proteids in the presence of water.

2. As a new article of manufacture a preparation consisting of a mixture of betain hydrochlorid and pepsin, which preparation is stable when preserved and is capable of digesting proteids in the presence of water.

In witness whereof I have hereunto signed my name, this 24th day of June, 1905, in the presence of two subscribing witnesses.

JULIUS ALTSCHUL.

Witnesses:
 HENRY HASPER,
 WOLDEMAR HAUPT.